(12) United States Patent
Chang

(10) Patent No.: US 9,323,091 B2
(45) Date of Patent: Apr. 26, 2016

(54) PROTECTIVE FILM FOR TOUCH PANEL AND METHOD FOR MANUFACTURING THE SAME

(71) Applicant: SAMSUNG DISPLAY CO., LTD., Yongin, Gyeonggi-Do (KR)

(72) Inventor: Se-In Chang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 79 days.

(21) Appl. No.: 13/943,761

(22) Filed: Jul. 16, 2013

(65) Prior Publication Data

US 2014/0102762 A1    Apr. 17, 2014

(30) Foreign Application Priority Data

Oct. 16, 2012  (KR) .......................... 10-2012-0114827

(51) Int. Cl.
*G06F 3/041* (2006.01)
*G02F 1/1333* (2006.01)

(52) U.S. Cl.
CPC ............ *G02F 1/13338* (2013.01); *G06F 3/041* (2013.01); *G06F 2203/04103* (2013.01); *Y10T 428/249921* (2015.04)

(58) Field of Classification Search
None
See application file for complete search history.

(56) References Cited

U.S. PATENT DOCUMENTS

2009/0212263 A1* 8/2009 Reynaud et al. .............. 252/500
2011/0050588 A1* 3/2011 Li .......................... G06F 3/0414
                                                        345/173

FOREIGN PATENT DOCUMENTS

| KR | 1997-0059303 | 8/1997 |
| KR | 10-2007-0053164 | 5/2007 |
| KR | 10-2010-0054013 | 5/2010 |
| KR | 10-2010-0061941 | 6/2010 |
| KR | 10-2011-0068661 | 6/2011 |

OTHER PUBLICATIONS

Korean Patent Abstracts, Publication No. 100189119 B1, dated Jan. 14, 1999, for corresponding Korean Patent KR 1997-0059303 listed above.

* cited by examiner

*Primary Examiner* — Sheeba Ahmed
(74) *Attorney, Agent, or Firm* — Lewis Roca Rothgerber Christie LLP

(57) ABSTRACT

A protective film configured to be positioned on a touch panel includes a transparent base material and a plurality of conductive particles included in the base material, and a manufacturing method of a protective film configured to be positioned on a touch panel includes: mixing conductive particles in a transparent base material composition; and pressing the base material composition to form a base material. According to exemplary embodiments, the protective film may reduce input errors by increasing touch sensitivity while protecting the touch panel.

20 Claims, 6 Drawing Sheets

PROTECTIVE FILM FOR TOUCH PANEL AND METHOD FOR MANUFACTURING THE SAME

CROSS-REFERENCE TO RELATED APPLICATION

This application claims priority to and the benefit of Korean Patent Application No. 10-2012-0114827 filed in the Korean Intellectual Property Office on Oct. 16, 2012, the entire contents of which are incorporated herein by reference.

BACKGROUND

1. Field

The described technology relates generally to a protective film for a touch panel and a manufacturing method thereof.

2. Description of the Related Art

In an electronic information terminal such as a mobile telephone, a personal digital assistant (PDA), or a global positioning system (GPS)/navigation device, in addition to displaying simple character information, various and complicated multimedia such as audio, motion pictures, and wireless Internet web browsing are being output/displayed in line with the development of communication technology. As described above, as the functions of the electronic information terminals have been developed, a touch screen has been developed as an input device capable of functioning for information input such as various text and graphics.

A touch screen is a screen that directly receives input data on a screen to confirm a desired position and perform a special process by stored software when a finger of a person or an object is touched to a character displayed on the screen or at a special position without using a keyboard.

The touch screen may obtain a function thereof by adding a device that is referred to as a touch panel to the screen of the general display device to detect the position of the finger or the object contacting a lattice of the screen. Accordingly, when the character or the graphic information that is previously displayed on the screen mounted with the touch panel is touched by the finger, the item the user selects is detected according to the position of the contacted screen and a command corresponding thereto is processed by a computer, and thereby the user may easily obtain the desired information.

The kind of touch screen is divided into a resistive type, a capacitive type, and an electro-magnetic type. These touch screens of various types are applied to an electronic product in consideration of signal amplification, a resolution difference, a difficulty of design and processing technology, optical characteristics, electronic characteristics, mechanical characteristics, inner characteristics, input characteristics, durability, and economy. Currently, the resistive type and the capacitive type are most commonly being applied.

Particularly, the capacitive type is driven by sensing an electrostatic discharge from a body. In some instances, a window is positioned over the touch panel to protect the touch panel and a protective film is positioned over the window to protect a surface of the window. The protective film, however, may reduce the sensitivity of the touch panel of the capacitive type, which can generate input errors on the touch panel.

The above information disclosed in this Background section is only for enhancement of understanding of the background of the described technology and therefore it may contain information that does not form the prior art that is already known in this country to a person of ordinary skill in the art.

SUMMARY

Exemplary embodiments according to the present invention provide a protective film having excellent touch sensitivity while protecting a touch panel.

A protective film configured to be positioned on a touch panel according to an exemplary embodiment of the present invention includes a transparent base material, and a plurality of conductive particles included in the base material.

The conductive particles may have a substantially spherical shape.

A diameter of the conductive particles may be in a range of 80%-95% of a thickness of the base material.

The conductive particles may be included at 1-10 particles per 1 $mm^2$ area in a direction perpendicular to a thickness direction of the base material.

The conductive particles may include an acryl core and a polyaniline layer enclosing a surface of the acryl core.

The conductive particles may have a fiber shape.

At least some of the conductive particles may be arranged in a thickness direction of the base material.

The conductive particles may have a length in a range of 100% to 150% of the thickness of the base material.

The protective film may further include a coating layer on an upper surface and a lower surface of the base material, the coating layer having higher hardness than the base material, wherein the coating layer has a plurality of conductive patterns.

A manufacturing method of a protective film configured to be positioned on a touch panel according to another exemplary embodiment of the present invention includes mixing conductive particle in a transparent base material composition, and pressing the base material composition to form a base material.

The method may further include providing a spherical core including an acryl material, distributing the spherical core in a monodispersed state having a substantially uniform size, and coating a polyaniline on a surface of the core to produce the conductive particles.

The conductive particles may have a fiber shape.

The method may further include after forming the base material, coating a layer having higher hardness than the base material on an upper surface and a lower surface of the base material.

The coating of the coating layer may include providing a coating layer base material composition, coating the coating layer base material composition on a surface of the base material, drying the coating layer base material composition, and hardening the coating layer base material composition to form the coating layer.

The coating of the coating layer base material composition on the base material may include forming a plurality of conductive patterns.

The coating of the coating layer base material composition on the base material may include one selected from bar coating, knife coating, gravure coating, micro-gravure coating, or slot die coating.

According to exemplary embodiments, the protective film may reduce input errors by improving touch sensitivity while simultaneously protecting the touch panel.

DETAILED DESCRIPTION

Figure 1:
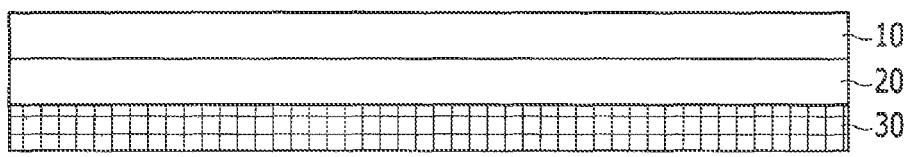
FIG. 1 is a schematic diagram of a protective film in use according to an exemplary embodiment.

The present invention will be described more fully hereinafter with reference to the accompanying drawings, in which exemplary embodiments of the invention are shown. However, the present invention is not limited to the exemplary embodiments described herein, and may be embodied in other forms, and rather, exemplary embodiments described herein are provided to thoroughly and completely explain the disclosed contents and to sufficiently transfer the ideas of the present invention to a person of ordinary skill in the art. Like reference numerals designate like elements throughout the specification.

In the drawings, the thickness of layers, films, panels, regions, etc., may have been exaggerated for clarity. In the drawings, for better understanding and ease of description, the thickness of some layers and areas may be exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. It will be understood that when an element such as a layer, file, region, or substrate is referred to as being "on" another element, it can be on the other element or under the other element. For example, the element is not necessarily on the other element in a gravity direction.

Figure 2A:
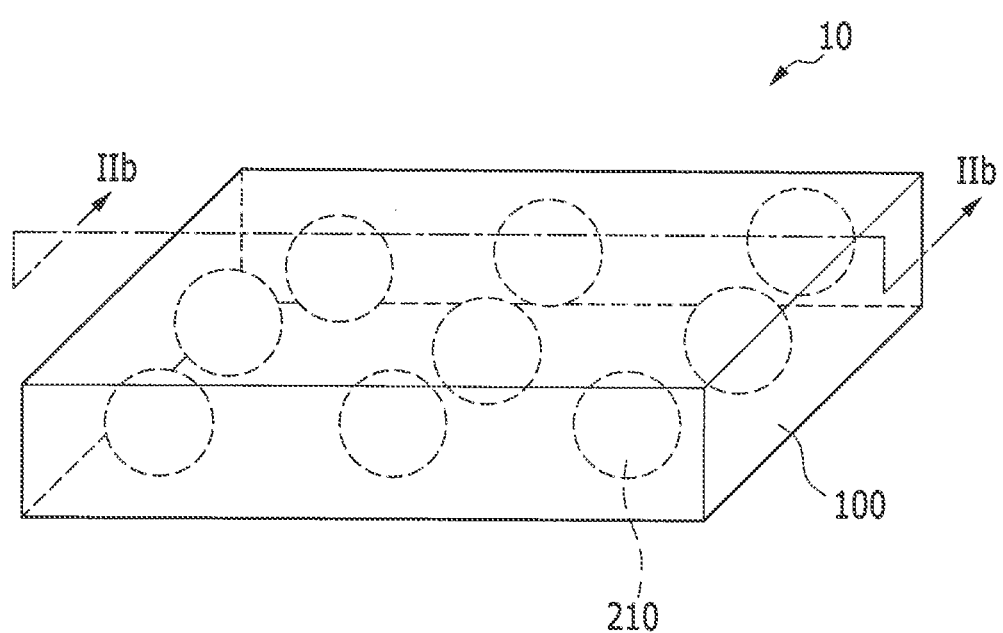
FIGS. 2A and 2B schematically show a perspective view and a cross-sectional view of a protective film according to an exemplary embodiment.
Figure 2B:
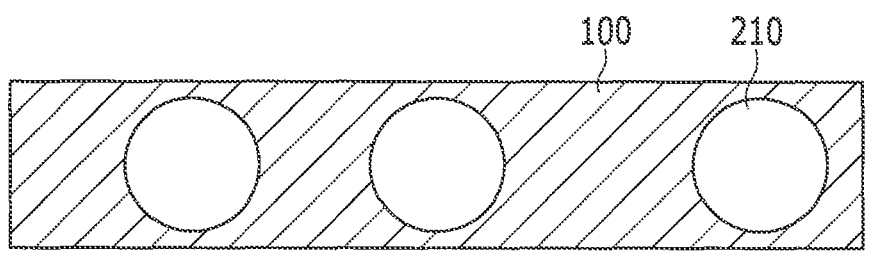

FIG. 1 is a schematic diagram of a protective film in use according to an exemplary embodiment, and FIGS. 2A and 2B schematically show a perspective view and a cross-sectional view of a protective film according to an exemplary embodiment. For example, FIG. 2B is a cross-sectional view taken along the line IIb-IIb of FIG. 2A.

To protect a surface of a touch panel 30, which is a capacitive type touch panel, as shown in FIG. 1, a window 20 may be positioned on a surface of the touch panel 30, and a protective film 10 for protecting the surface of the window 20 may also be positioned over the touch panel 30. The window 20 and the protective film 10 are made of a transparent material for enabling light emitted from a display device (not shown) that displays an image to be transmitted therethrough.

Referring to FIG. 2, the protective film 10 according to an exemplary embodiment includes a base material 100 and conductive particles 210.

The base material 100 is made of the transparent material for enabling the light emitted from the display device to be transmitted therethrough, has a plate shape (e.g., formed as a plate having a predetermined thickness), and is located on the surface of the window 20. In the described embodiment, the base material 100 has a thickness of about 50 micrometers (μm) to about 200 μm, but it is not limited thereto, and any suitable thickness having sufficient light transmittance (e.g., light transmittance of more than a predetermined reference amount) while preventing scratches to the surface of the window 20 is possible.

The base material 100 may be formed of a polymer having excellent light transmittance, mechanical strength, thermal stability, and moisture stability. For example, ethylene vinylacetate (EVA), polycarbonate (PC), polyethylene terephthalate (PET), amorphous polyethylene terephthalate (APET), polypropylene terephthalate (PPT), polynaphthalene terephthalate (PEN), polyethylene terephthalate glycerol (PETG), polycyclohexylene dimethylene terephthalate (PCTG), modified tri-acetyl-cellulose (TAC), cyclic olefin polymer (COP), cyclic olefin copolymer (COC), dicyclopentadiene polymer (DCPD), cyclopentadiene polymer (CPD), polymethyl methacrylate (PMMA), polyimide (PI), polyacrylate (PAR), polyethersulfone (PES), polyetherimide (PEI), silicone resin, fluorine resin, a modified copolymer of which one or more plastic resins such as a modified epoxy resin is mixed, or a blended resin may be used.

The conductive particles are located inside the base material 100, and are configured to transmit a parasitic capacitance generated by the touch of a user to the touch panel 30, thereby reducing contact resistance generated when touching, and improving reliability of the touch panel operation.

The conductive particles 210 may be formed to be substantially spherical as shown in FIGS. 2A and 2B, and may include a core made of an acryl material and a polyaniline layer enclosing (e.g., coating or surrounding) the surface of the core. A diameter of the conductive particles 210 having the substantially spherical shape may be in a range of from about 80 percent (%) to about 95% of the thickness of the base material 100. When the diameter of the conductive particles 210 is less than 80%, an effect by the conductive particles may be slight, and when the diameter of the conductive particles 210 is more than 95%, protrusions and depressions may be generated on the surface of the base material 100.

According to the described embodiment, the conductive particles 210 having the substantially spherical shape are formed to be included at 1-10 particles per area of 1 square millimeter ($mm^2$) in a direction perpendicular to the thickness direction of the base material 100 such that they may be uniformly disposed and the effects may be sufficiently obtained. When the conductive particles 210 are mixed at less than 1 per 1 $mm^2$ of the base material 100, the conductivity effect is slight, and when the conductive particles 210 are mixed at more than 10 per 1 $mm^2$ of the base material 100, the conductivity effect is good but the visibility is decreased.

Figure 3A:
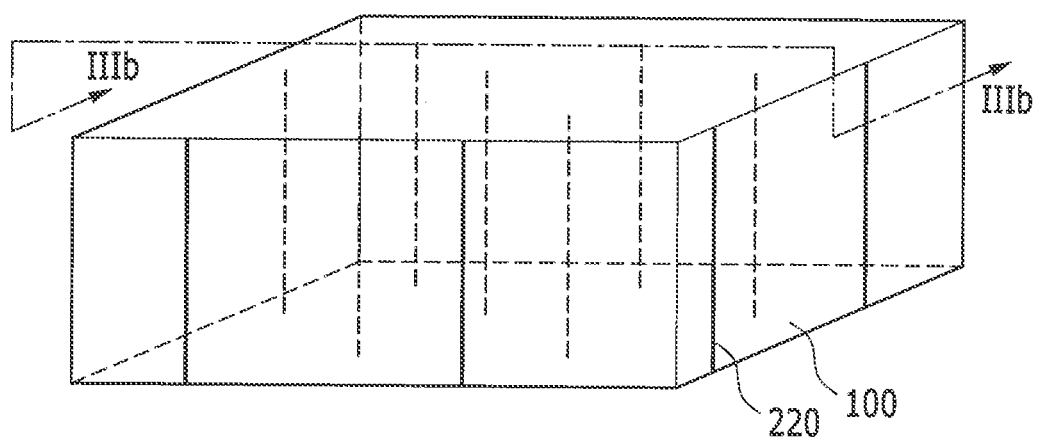
FIGS. 3A and 3B schematically show a perspective view and a cross-sectional view of an exemplary variation of a protective film according to an exemplary embodiment.
Figure 3B:
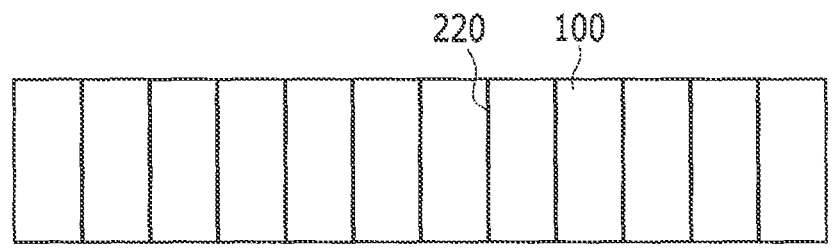

FIGS. 3A and 3B are a schematic perspective view and a schematic cross-sectional view, respectively, of an exemplary variation of a protective film according to an exemplary embodiment. For example, FIG. 3B is a schematic cross-sectional view taken along the line IIIb-IIIb of FIG. 3A.

Conductive particles 220 may be formed with a fiber shape (e.g., as a plurality of adjacent strands of conductive particles arranged substantially parallel with respect to the thickness direction of the base material 100) as shown in FIG. 3. The conductive particles 220 may be made of a conductive metal fiber including a conductive metal, and the conductive metal fiber may be manufactured by stretching a base material (e.g., stainless steel wire), while performing a heat treatment on the base material. Alternatively, the conductive particles 220 may be manufactured using a coil cutting method of manufacturing a metal fiber by cutting a metal film, an in-rotating liquid spinning method of manufacturing the fiber by spraying a melted alloy, or a vibration cutting method of cutting the fiber from a metal block through vibration, or other suitable conductive particle manufacturing method.

According to the described exemplary embodiment, at least a portion of the conductive particles 220 of the fiber shape may be arranged in the thickness direction of the base material 100. As shown in FIG. 3B, both ends of the conductive particles 220 of the fiber shape may be exposed through opposing surfaces of the base material 100, and the conductive particles 220 have a small diameter (e.g., of several µm) such that the visibility through the base material 100 is not decreased even though portions of both ends of the conductive particles 220 are exposed through opposing surfaces of the base material 100. Although both ends of the conductive particles 220 of the fiber shape are exposed through opposing surfaces of the base material 100, in the described embodiment, the conductive particles 220 have a length in a range of about 100% to about 150% of the thickness of the base material. When the length of the conductive particles 220 of the fiber shape is less than about 100% compared with the thickness of the base material 100, the opposing ends of the conductive particles 220 may not be exposed through the surface of the base material 100, and when the length of the conductive particles 220 of the fiber shape is more than 150% of the thickness of the base material 100, the visibility through the base material 100 may be decreased.

Figure 4:
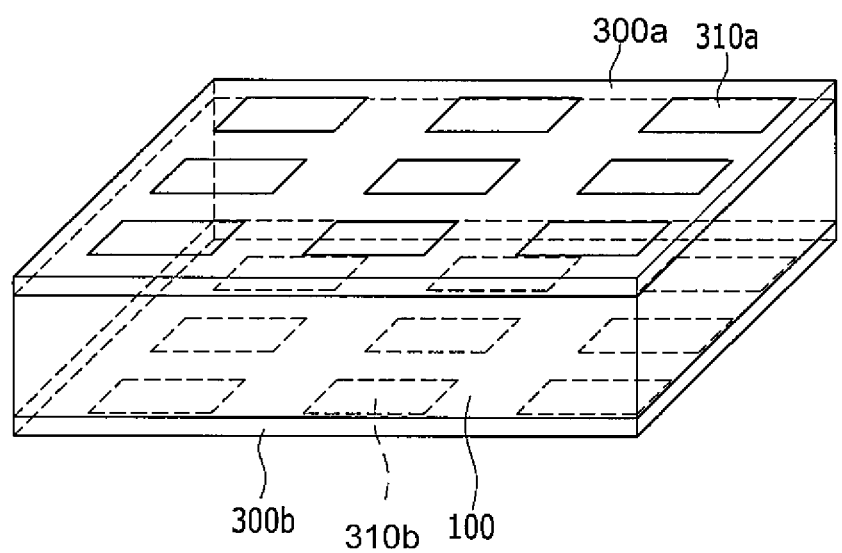
FIG. 4 is a schematic perspective view of a protective film according to another exemplary embodiment.

FIG. 4 is a schematic perspective view of a protective film according to another exemplary embodiment.

Referring to FIG. 4, a protective film according to the present exemplary embodiment except for coating layers 300a and 300b outside the base material 100 is the same as the protective film of the previously described exemplary embodiment. The same members as in the previously described exemplary embodiment are indicated by the same reference numerals.

To improve protection of the surface of the protective film while further increasing the conductivity of the protective film, coating layers 300a and 300b may be respectively positioned over the upper and lower surfaces of the base material 100. The coating layers 300a and 300b have higher hardness (e.g., firmness or density) than the base material 100, and the coating layers 300a and 300b are respectively formed as a plurality of conductive patterns 310a and 310b.

According to the described embodiment, the coating layers 300a and 300b have a pencil hardness of more than 3H in a thickness ranging from about 1 µm-about 10 µm. When the thickness of the coating layers 300a and 300b is less than about 1 µm, the surface protection effect is slight even if the hardness is more than 3H, while when the thickness of the coating layers 300a and 300b is more than 10 µm, a curling phenomenon in which the coating layer is rolled may be generated.

The coating layers 300a and 300b include the plurality of conductive patterns 310a and 310b, as shown in FIG. 4. According to the described embodiment, the conductive patterns 310a and 310b are uniformly arranged in a matrix format to improve visibility through conductive layers 300a and 300b, and the conductive patterns 310a and 310b may include a silver nanowire for conductivity. The electrostatic capacitance generated by the touch of the user may be transmitted to the touch panel 30 by way of the conductive pattern 310a of the coating layer 300a positioned over the base material 100, the conductive particles 210 and 220 in the base material 100, and the conductive pattern 310b of the coating layer 300b positioned under the base material 100.

Next, a manufacturing method of the protective film according to an exemplary embodiment will be described.

The manufacturing method of the protective film according to an exemplary embodiment includes providing the conductive particles 210 and 220, mixing the conductive particles 210 and 220 into a transparent base material composition, and pressing the base material composition to form a base material.

The spherical conductive particles 210 may be formed by providing a plurality of spherical cores including an acryl material, distributing the spherical cores in a monodispersed state having a substantially uniform size, and coating (e.g., covering or encapsulating) a polyaniline on the surface of the spherical cores. The conductive particles 220 of the fiber shape may be manufactured by stretching a base material (e.g., stainless steel wire) while performing a heat treatment on the base material, a coil cutting method of manufacturing a metal fiber by cutting a metal film, an in-rotating liquid spinning method of manufacturing the fiber by spraying a melted alloy, or a vibration cutting method of cutting the fiber from a metal block through vibration.

The above manufactured conductive particles 210 and 220 are mixed with a base material composition of a liquid. The base material composition may be selected among various polymers having sufficient light transmittance (e.g., light transmittance of more than a predetermined reference amount), as described above. The mixture ratio of the base material composition may be controlled such that the conductive particles 210 and 220 are included at 1-10 particles per 1 $mm^2$ area in the direction perpendicular to the thickness direction of the manufactured base material 100.

The base material composition that is mixed with the conductive particles 210 and 220 is pressed out through an extruder to form a base material of a plate shape (e.g., formed as a plate or substrate having a predetermined thickness). The base material 100 is manufactured by pressing the base material composition that is mixed with the conductive particles 210 and 220 such that the conductive particles 210 and 220 in the base material 100 may be substantially uniformly distributed.

After forming the base material 100, the coating layers 300a and 300b, having higher hardness than the base material, may be coated on the upper surface and the lower surface of the base material 100. Coating the coating layers 300a and 300b, providing the coating layer base material composition, coating the coating layer base material composition on the surface of the base material 100, drying the coating layer base material composition, and hardening the coating layer base material composition to form the coating layer may be included.

The coating layer base material composition may be selected from ultraviolet (UV) hardening resins. The coating layer base material composition may be manufactured by mixing a solvent having solubility and swellability compatible with the UV hardening resin. The solvent may be manufactured by variously selecting ketones, ethers, a compound including nitrogen, and mixtures thereof.

The coating layer base material composition that is mixed with the solvent is coated on the surface of the base material 100. The coating layer base material composition may be coated using a bar coating method, a knife coating method, a gravure coating method, a micro-gravure coating method, or a slot die coating method, but is not limited thereto. The plurality of conductive patterns 310a and 310b may be formed using any suitable coating method that is known in the art for this purpose.

The coating layer base material composition coated on the surface of the base material 100 is dried to remove the solvent, and the dried coating layer base material composition is hardened. The drying and hardening of the coating layer base material composition may be performed by using one of ultraviolet (UV) lamps such as a high pressure mercury vapor lamp, a metal halide lamp, a xenon lamp, or an induction lamp of a microwave method.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, or their equivalents.

<Description of Some of the Reference Symbols>

| | |
|---|---|
| 10: protective film | 20: touch film |
| 100: base material | 210: spherical conductive particle |
| 220: fiber conductive particle | 300a, 300b: coating layer |
| 310a, 310b: conductive pattern | |

What is claimed is:

1. A touch screen comprising:
    a touch panel; and
    a protective film at an outermost surface of the touch panel, the protective film comprising:
        a transparent base material; and
        a plurality of conductive particles throughout the base material.

2. The touch screen of claim 1, wherein the conductive particles have a substantially spherical shape.

3. The touch screen of claim 2, wherein a diameter of the conductive particles is in a range of 80%-95% of a thickness of the base material.

4. The touch screen of claim 3, wherein the conductive particles are included at 1-10 particles per 1 mm² area in a direction perpendicular to a thickness direction of the base material.

5. The touch screen of claim 2, wherein the conductive particles comprise an acryl core and a polyaniline layer enclosing a surface of the acryl core.

6. A touch screen comprising:
    a touch panel; and
    a protective film at an outermost surface of the touch panel, the protective film comprising:
        a transparent base material; and
        a plurality of conductive particles throughout the base material,
    wherein the conductive particles have a fiber shape.

7. The touch screen of claim 6, wherein at least some of the conductive particles are arranged in a thickness direction of the base material.

8. The touch screen of claim 6, wherein the conductive particles have a length in a range of 100%-150% of the thickness of the base material.

9. The touch screen of claim 1, further comprising a coating layer on an upper surface and a lower surface of the base material, the coating layer having higher hardness than the base material,
    wherein the coating layer has a plurality of conductive patterns.

10. A manufacturing method of a protective film for a touch panel to be positioned at an outermost surface of the touch panel to protect the outermost surface of the touch panel, the method comprising:
    mixing conductive particles in a transparent base material composition; and
    pressing the base material composition to form the protective film including the conductive particles throughout the base material.

11. The method of claim 10, further comprising:
    providing a plurality of spherical cores including an acryl material;
    distributing the spherical cores in a monodispersed state having a substantially uniform size; and
    coating a polyaniline on a surface of the spherical cores to produce the conductive particles.

12. The method of claim 10, wherein the conductive particles have a fiber shape.

13. The method of claim 10, further comprising, after forming the protective film, coating a coating layer having higher hardness than the base material on an upper surface and a lower surface of the protective film.

14. The method of claim 13, wherein the coating of the coating layer comprises:
    providing a coating layer base material composition;
    coating the coating layer base material composition on a surface of the protective film;
    drying the coating layer base material composition; and
    hardening the coating layer base material composition to form the coating layer.

15. The method of claim 14, wherein the coating of the coating layer base material composition on the protective film comprises forming a plurality of conductive patterns.

16. The method of claim 15, wherein the coating of the coating layer base material composition on the protective film comprises one selected from bar coating, knife coating, gravure coating, micro-gravure coating, or slot die coating.

17. The touch screen of claim 1, wherein The base material is solid.

18. The touch screen of claim 17, wherein the base material comprises a polymer.

19. The method of claim 10, wherein the base material is solid.

20. The method of claim 19, wherein the base material comprises a polymer.

* * * * *